Dec. 4, 1962

J. A. PITTS 3,066,313

FLUSH VALVE ASSEMBLY

Filed Dec. 18, 1961

INVENTOR
James A. Pitts

United States Patent Office 3,066,313
Patented Dec. 4, 1962

3,066,313
FLUSH VALVE ASSEMBLY
James A. Pitts, 1527 Locust St., Louisville 6, Ky.
Filed Dec. 18, 1961, Ser. No. 160,177
3 Claims. (Cl. 4—60)

This invention relates generally to valve construction, and more specifically to certain new and useful improvements in the construction of flush valves for use in water closets.

The conventional flush valve used in a water closet involves a number of components which cooperate with each other in a somewhat haphazard manner and frequently result in an improper setting of the valve on the valve seat and thus creating a leak which may not be readily detected. Further, known valves of this class involve metal components which tend to bang against each other during operation to create unnecessary noise and wear. My invention is directed towards certain improvements in flush valve construction wherein the valve seat is constructed as a replaceable component and wherein the bulb shaped valve is constructed of plastic and will last indefinitely. The valve structure of my invention is designed such that the valve will positively seat in an accurate relationship with respect to the cooperating valve seat thereby ensuring a perfect seal following each operation of the valve.

It is therefore a primary object of this invention to provide a flush valve assembly which is constructed from a minimum number of components each functioning in an efficient and noiseless manner.

It is a further object of this invention to provide a flush valve assembly of the above class wherein the valve seat is constructed of molded rubber and may be replaced when worn.

It is a still further object of this invention to provide a flush valve for a water closet wherein the overflow features of the valve enable use in tanks of various size and depth, the said overflow forming a part of the bulb valve structure.

A full understanding of the details of the invention, together with further advantages, will become apparent by reference to the following detailed description of a preferred embodiment thereof, taken in conjunction with the attached drawings wherein.

Figures 1, 2:
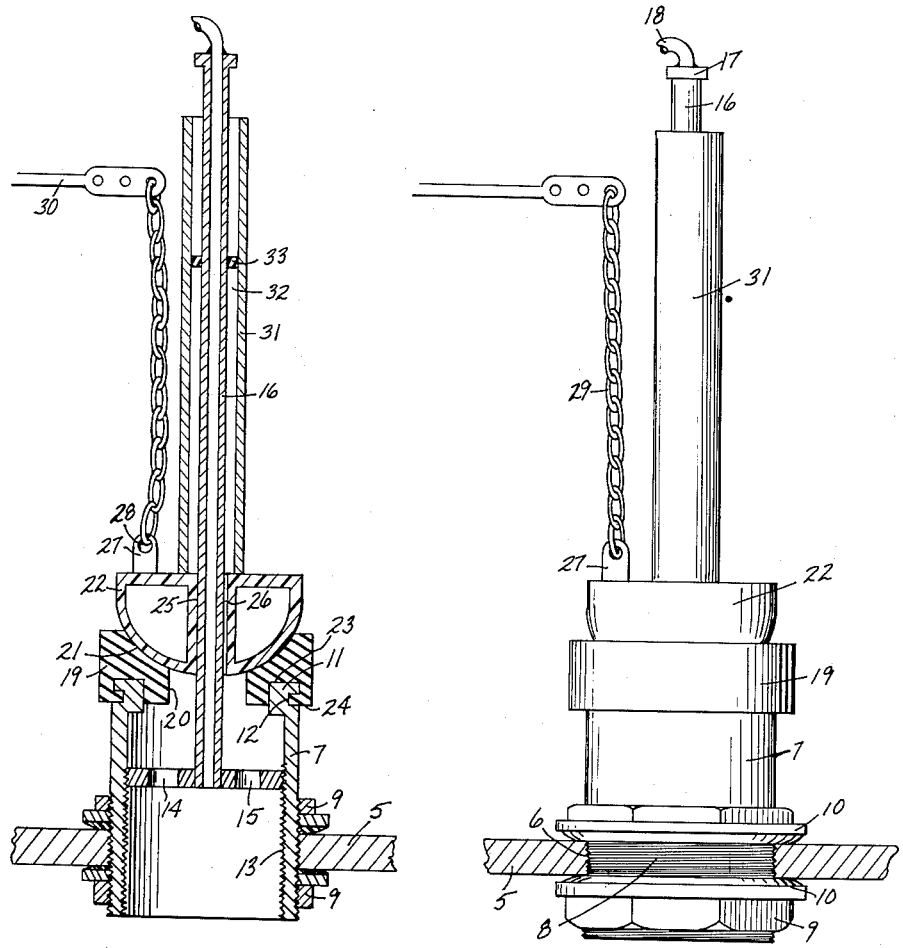
FIG. 1 is a cross sectional side elevation of the flush valve assembly which comprises my invention.
FIG. 2 is a side elevation of the structure shown mounted to the base of a water storage tank.

Referring now to the drawings in detail, the numeral 5 represents the base of a water storage tank, the said base having a hole 6 formed therethrough for mounting the valve assembly of my invention. A delivery pipe 7 is threaded externally at 8 and mounts two locking nuts 9 for engagement on either side of the base 5 so as to lock the pipe with respect to the said base. Suitable washers 10 are disposed between the locking nut and the base so as to ensure a water tight seal. The delivery pipe projects upwardly into the water storage tank and terminates with an inwardly extending flange 11 having an annular groove 12 extending around its outer periphery. The lower end of the pipe is internally threaded at 13 to receive an adjustable anchor plate 14 suitably perforated as at 15 to provide a free passage therethrough. A hollow tube 16 projects vertically from the centre of the anchor plate 14 and terminates remotely therefrom at 17 with a coupling to a pipe 18 which supplies water to replenish a toilet bowl after flushing.

A molded rubber seat 19 has a central bore 20 formed therethrough, the said bore extending upwardly to form a semispherical seat surface 21 for selective sealing engagement by a flush ball or bulb 22. The rubber seat is formed with an L shaped groove 23 which extends inwardly of the lower end 24 to form a peripheral recess for releasably engaging over the flange 11 and interlocking in the groove 12 formed therein.

The ball or bulb 22 is semi-spherical in shape and is molded in plastic material so as to accurately seat within the rubber seat 19. An axial guide tube within the bulb defines a hole 25 formed centrally through the bulb which is scalloped at 26 around its periphery so as to permit water to flow therethrough and to provide a guide for sliding engagement with respect to the hollow tube 16. A tab 27 upstands from the top of the bulb and is drilled at 28 to receive one end of a chain 29 for selectively operating the valve through a conventional pivotally actuated lever 30. An overflow sleeve 31 is mounted concentrically on the ball 22 so as to surround the scalloped hole formed therethrough. The sleeve extends vertically in a surrounding manner about the hollow tube 16 so as to provide an annular channel 32 through which overflow water may pass for dispensing through the delivery pipe 7. An apertured guide ring 33 is mounted around the hollow tube 16 so as to slidably engage with the inner peripheral surface of the overflow sleeve 31 and ensure the precise alignment with respect to the valve seat 19. The overflow sleeve may also be formed of plastic if so desired.

From the foregoing, it is believed that the construction, operation and advantages of this invention will be fully apparent. However, since numerous modifications will occur to those skilled in the art, it is not desired to limit the construction exactly to that shown and described, and accordingly the scope of this invention is defined by the following claims.

I claim:

1. A flush valve assembly for mounting upon the base of a water closet tank comprising, in combination, a delivery pipe removably secured to project through the base and into the tank, a flange formed at the innermost end of the pipe, a rubber valve seat removably secured over the flange, a hollow tube anchored centrally on the pipe and projecting there above to terminate with a water delivery pipe, a semi-spherical plastic ball valve having an internally scalloped axial guide tube defining a restricted opening for slidably locating over the hollow tube, an overflow sleeve secured to the top of said ball valve and surrounding the hollow tube to form an annular space therebetween, an apertured guide mounted upon said tube in axial alignment with said guide tube aligning the tube concentrically within the sleeve, said guide tube and said apertured guide guiding said sleeve for reciprocating coaxial movement relative to said hollow tube, and a tab protruding from the top of the ball valve for cooperation with a lever for lifting the valve out of engagement with the valve seat.

2. A flush valve assembly according to claim 1, wherein said rubber valve seat is provided with a semi-spherical upwardly facing seat surface for receiving the valve, said seat having an L shaped groove formed inwardly of the underside for locking engagement on the flange.

3. A flush valve assembly according to claim 1, wherein said ball valve and said overflow sleeve are molded in plastic.

References Cited in the file of this patent

UNITED STATES PATENTS

| | | |
|---|---|---|
| 2,613,367 | Denham | Oct. 14, 1952 |
| 2,614,263 | Kass | Oct. 21, 1952 |
| 2,907,050 | Harris | Oct. 6, 1959 |